United States Patent Office 2,958,704
Patented Nov. 1, 1960

2,958,704

ALKENYL ISOCYANATE-SUBSTITUTED CARBAMATES

Kornelius Dinbergs, Cleveland, and Charles S. Schollenberger, Cuyahoga Falls, Ohio, assignors to The B. F. Goodrich Company, New York, N.Y., a corporation of New York.

No Drawing. Filed Sept. 2, 1958, Ser. No. 758,563

7 Claims. (Cl. 260—468)

This invention relates to novel alkenyl isocyanates and method for preparing same and it more particularly pertains to monoalkenyl urethane monoisocyanates and to the method for their preparation.

We have discovered a new composition of matter conforming to the structure

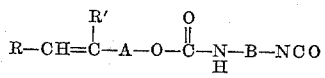

wherein R and R' represent hydrogen, an alkyl group having from 1 to 6 carbon atoms and an aryl group having from 6 to 10 carbon atoms; A represents an alkylene group having from 1 to 6 carbon atoms, anacyloxyalkylene group and particularly a carbonyloxyalkylene group having from 2 to 7 carbon atoms, and an oxyalkylene group having from 1 to 6 carbon atoms; B represents a nuclear substituted arylene group having from 6 to 18 carbon atoms having at least one nuclear substituent ortho to the —NCO group attached thereto, a divalent aliphatic hydrocarbon radical having from 3 to 18 carbon atoms having the —NCO group attached to a tertiary carbon atom thereof and a divalent alicyclic hydrocarbon radical having from 4 to 12 carbon atoms having the —NCO group attached to a tertiary carbon atom thereof.

The monoalkenyl urethane monoisocyanates embodied in the present invention are useful for the introduction of alkenyl unsaturation into polymeric materials containing hydrogens which are reactive with isocyanates. The terminal hydroxyl groups on polyethers, for example, will react with many of the compounds of this invention yielding intermediate polymers which can be cured with peroxides to rubbery or resinous products as described in our copending U.S. patent application Serial No. 758,542, filed September 2, 1958. The hydroxyl groups in sucrose can be made to react with the —NCO group of the monoalkenyl urethane monoisocyanates of this invention to produce polyalkenyl polyurethanes which serve as drying oils and cross-linking agents in vinyl polymerizations.

The monoalkenyl urethane monoisocyanates embodied in this invention will also homopolymerize or copolymerize with other vinyl monomers such as vinyl acetate, acrylic acid and methacrylic acid esters, acrylonitrile, methacrylonitrile, styrene, and the like to form high polymers containing reactive —NCO groups which are available for reaction with active hydrogen compounds to bring about further modification of the polymers. The homopolymers of the monoalkenyl urethane monoisocyanates of this invention are themselves useful adhesives, plastics and in some cases rubbers.

Representative monoalkenyl urethane monoisocyanates embodied in the present invention having the structure

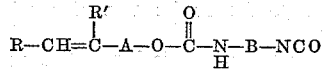

include those wherein R and R' can be hydrogen, methyl, ethyl, n-propyl, isopropyl, n-butyl, secondary butyl, isobutyl, tertiary butyl, amyl, hexyl, cyclohexyl, phenyl, toluyl xylyl, and naphthyl radicals; and R and R' can be the same or different; A can be an alkylene group having from 1 to 6 carbon atoms including methylene, ethylene, propylene, butylene, amylene, hexylene and cyclohexylene, an acyloxyalkylene group and particularly a carbonyloxyalkylene group having from 2 to 7 carbon atoms of the type

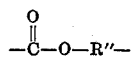

wherein R" can be an alkylene group having from 1 to 6 carbon atoms, an oxyalkylene group having from 1 to 6 carbon atoms of the type —O—R"— wherein R" has the aforementioned designation; and B can be a nuclear substituted arylene group having from 6 to 18 carbon atoms having at least one nuclear substitutuent ortho to the —NCO group attached thereto, a divalent aliphatic hydrocarbon radical having from 3 to 18 carbon atoms having the —NCO group attached to a tertiary carbon atom thereof and a divalent alicyclic hydrocarbon radical having from 4 to 12 carbon atoms having the —NCO group attached to a tertiary carbon atom thereof, such as 2,4-tolylene, 2,5-tolylene, 3,4-o-xylylene, 3,5-o-xylylene, 2,5-m-xylylene, 4,5-(1,2,3-trimethyl)phenylene, 1-chloro-2,3-phenylene, 1-chloro-2,4-phenylene, 1,2-dichloro-3,4-phenylene, 1,2-dichloro-3,5-phenylene, 1-ethyl-2,4-phenylene, 1,2-di-n-propyl-3,5-phenylene, 1,1-dimethyl-1,2-ethylene, 1,1-dimethyl-1,3-propylene, 1,1-di-n-butyl-1,8-octamethylene, 1,8-diisocyanato-p-menthane, 1-methyl-1,4-cyclohexylene and the like and others.

Representative monoalkenyl urethane monoisocyanates embodied in this invention include those with the following structures:

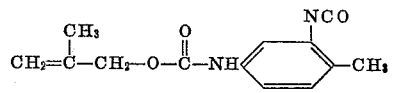

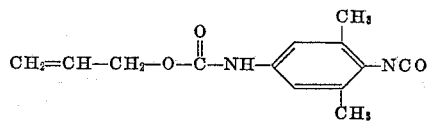

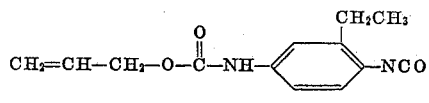

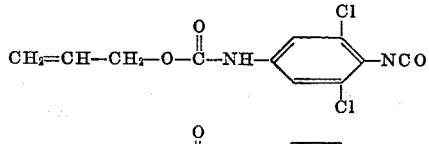

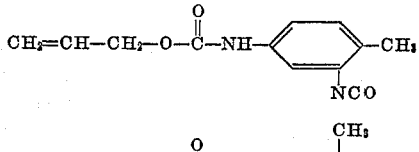

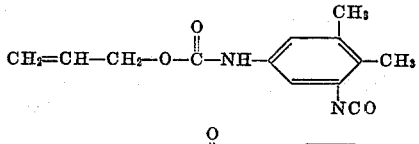

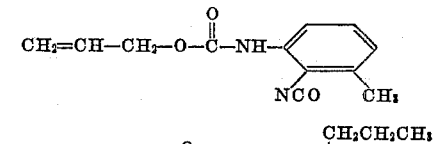

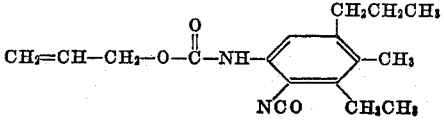

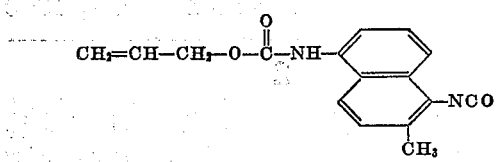
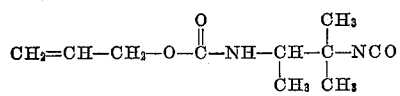

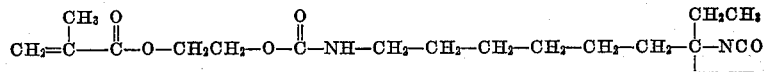

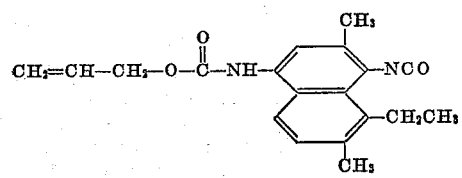
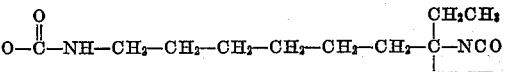

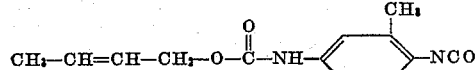
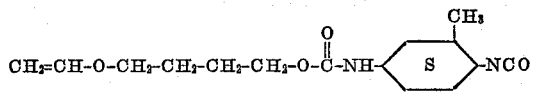

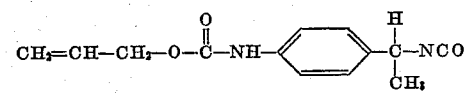
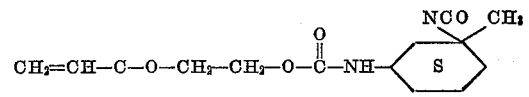

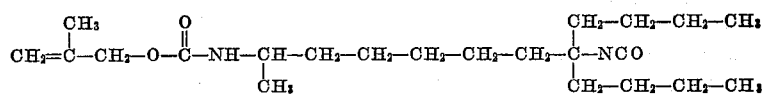

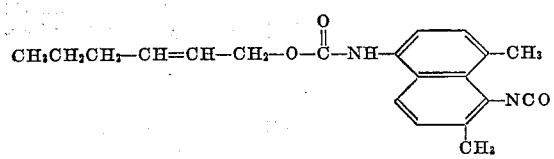

The most preferred monoalkenyl urethane monoisocyanates are the monoallyl urethane of 2,4-tolylene diisocyanate, the monomethallyl urethane of 2,4-tolylene diisocyanate, the mono(1,4-butanediol monovinyl ether) urethane of 2,4-tolylene diisocyanate, the monocrotyl urethane of 2,4-tolylene diisocyanate, the mono(ethylene glycol monomethacrylate)urethane of 2,4-tolylene diisocyanate and the monoallyl urethane of 1,8-diisocyanato-p-menthane.

The products of this invention are prepared by bringing together substantially equimolar quantities of a compound having the structure $$R-CH=\overset{R'}{\underset{}{C}}-A-O-H$$

with a compound having the structure OCN—B—NCO wherein R, R', A and B have the aforementioned designations.

The monoalkenyl urethane monoisocyanates embodied in this invention are most conveniently prepared by mixing substantially one mole of a diisocyanate having isocyanate groups of unlike reactivity with substantially one mole of a monoalkenyl monohydroxy compound and allowing them to react in the substantial absence of water at a temperature of from 0° C. or lower to 100° C. or higher, preferably at from about 25° C. to about 60° C., with or without an inert diluent. Inert diluents which are useful in the process of this invention include aromatic hydrocarbons such as benzene, toluene and the xylenes; halogenated hydrocarbons such as chlorobenzene and bromobenzene; halogenated aliphatic hydrocarbons such as chloroform and carbon tetrachloride; ethers such as diethyl ether, dioxane and tetrahydrofuran and the like and others. Any compound which is liquid at reaction temperature and which will not react with either the diisocyanate or the alcohol can be used as a diluent.

The following examples are illustrative of the product and process of this invention, it being understood that various changes therein may be made by those skilled in

Example I

The monoallyl urethane of 2,4-tolylene diisocyanate was prepared in a 1000 ml. 3-necked flask fitted with a mechanical stirrer, thermometer, dropping funnel and reflux condenser protected from atmospheric moisture by a calcium chloride drying tube. The reaction flask was immersed in an ice bath during the reaction period. A 325 g. (1.87 mole) sample of 2,4-tolylene diisocyanate was placed in the flask, stirring was commenced and 107 g. (1.85 mole) of well dried allyl alcohol were added during a period of 7 hours and the reaction temperature was maintained somewhat below 30° C. during the addition. The product was a colorless liquid at room temperature which solidified upon cooling in the refrigerator. The product, the monoallyl urethane of 2,4-tolylene diisocyanate boiled at 142°–149° C. at 1 mm. and had the following analysis:

Calcd. for —NCO _____ 18.09%
    Found _____ 18.29%, 18.35%

One mole of a hydroxyl terminated polytetramethylene oxide was treated with two moles of the monoallyl urethane of 2,4-tolylene diisocyanate at about 100° C. and the product which showed no increase in viscosity over that of the starting polymer was cured to a rubber in a closed mold at 130° C. This experiment proves the structure of the monoallyl urethane of 2,4-tolylene diisocyanate and disproves the presence of a mixture of 2,4-tolylene diisocyanate and the diallylurethane of 2,4-tolylene diisocyanate.

Example II

The mono-(ethylene glycol monomethacrylate) urethane of 2,4-tolylene diisocyanate was prepared by adding 44 g. (0.34 mole) of freshly distilled ethylene glycol monomethacrylate slowly to 60 g. (0.34 mole) of 2,4-tolylene diisocyanate at room temperature for three hours at which time a precipitate formed. A 100 ml. portion of benzene was added to the reaction mixture and the remainder of the glycol monomethacrylate was added slowly to the resulting solution over a 2½ hour period. The benzene was then removed at reduced pressure leaving the white solid product which melted at about 70° C.

Example III

The mono-(1,4-butanediol monovinyl ether) urethane of 2,4-tolylene diisocyanate was prepared in a manner similar to that described for the preparation of the monoallyl urethane of 2,4-tolylene diisocyanate in Example I. The reaction temperature was maintained at 40–50° C. while 16 g. of freshly distilled 1,4-butanediol monovinyl ether were added slowly over a period of an hour and ten minutes to 24 g. of 2,4-tolylene diisocyanate. The product, the mono-(1,4-butanediol monovinyl ether) urethane of 2,4-tolylene diisocyanate was isolated as a colorless liquid.

Example IV

The monocrotyl urethane of 2,4-tolylene diisocyanate was prepared from crotyl alcohol and 2,4-tolylene diisocyanate by the method described in Example I. The product was a liquid having the following analysis:

Calcd. for —NCO _____ 17.0%
    Found _____ 17.0%, 17.1%

Example V

The monomethallyl urethane of 2,4-tolylene diisocyanate was prepared by heating a mixture of 27 g. of 2,4-tolylene diisocyanate and 11.2 g. of methallyl alcohol at 67° C. for 30 minutes. The product was a liquid having the following analysis:

Calcd. for —NCO _____ 17.1%
    Found _____ 16.8%, 16.7%

Example VI 3.4 g. of allyl alcohol were added slowly to 13 g. of 1,8-diisocyanato-p-menthane over a 40 minute period in the presence of a lead naphthenate catalyst (1%) which was used to speed up the reaction. The mixture was then heated at 50° C. for 40 minutes to yield the liquid monoallyl urethane of 1,8-diisocyanato-p-menthane.

We claim:

1. The composition conforming to the structure

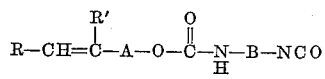

wherein R and R' are members of the class consisting of hydrogen, an alkyl group having from 1 to 6 carbon atoms and an aryl group having from 6 to 10 carbon atoms; A is a member of the class consisting of an alkylene group having from 1 to 6 carbon atoms, an carbonyloxyalkylene group having from 2 to 7 carbon atoms, and an oxyalkylene group having from 1 to 6 carbon atoms; B is a member of the class consisting of a nuclear substituted arylene group having from 6 to 18 carbon atoms and having at least one nuclear substituent selected from the class consisting of chlorine, methyl, ethyl and propyl groups ortho to the —NCO group attached thereto, a divalent aliphatic hydrocarbon radical having from 3 to 18 carbon atoms having the —NCO group attached to a tertiary carbon atom thereof and a divalent alicyclic hydrocarbon radical having from 4 to 12 carbon atoms having the —NCO group attached to a tertiary carbon atom thereof.

2. The compound having the structure

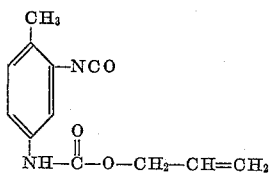

3. The compound having the structure

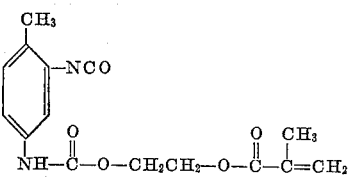

4. The compound having the structure

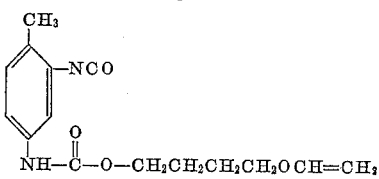

5. The compound having the structure

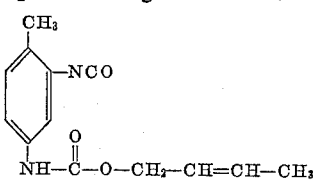

6. The compound having the structure

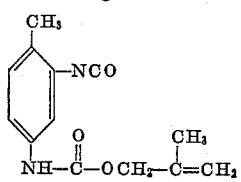

7. The compound having the structure
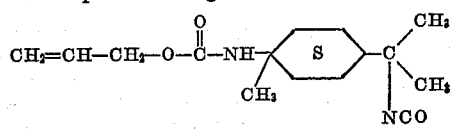
References Cited in the file of this patent
UNITED STATES PATENTS
| | | |
|---|---|---|
| 2,556,437 | Mowry et al. | June 12, 1951 |
| 2,683,728 | Mastin et al. | July 13, 1954 |